(12) United States Patent
Hirato

(10) Patent No.: US 9,383,609 B2
(45) Date of Patent: Jul. 5, 2016

(54) LIQUID CRYSTAL DISPLAY DEVICE

(71) Applicant: Sharp Kabushiki Kaisha, Osaka-shi, Osaka (JP)

(72) Inventor: Shinichi Hirato, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/541,256

(22) Filed: Nov. 14, 2014

(65) Prior Publication Data

US 2016/0139441 A1   May 19, 2016

(51) Int. Cl.
*G02F 1/1339* (2006.01)

(52) U.S. Cl.
CPC .... *G02F 1/1339* (2013.01); *G02F 2001/13398* (2013.01)

(58) Field of Classification Search
CPC ............ G02F 1/1339; G02F 2001/13398
See application file for complete search history.

(56) References Cited

U.S. PATENT DOCUMENTS

| | | | |
|---|---|---|---|
| 2004/0135959 A1 | 7/2004 | Choi | |
| 2006/0238692 A1 | 10/2006 | Hirato et al. | |
| 2009/0289260 A1* | 11/2009 | Sonoda | G02F 1/133723 257/72 |
| 2010/0231842 A1* | 9/2010 | Ishitani | G02F 1/13394 349/156 |
| 2012/0086901 A1* | 4/2012 | Nakagawa | G02F 1/13394 349/155 |

FOREIGN PATENT DOCUMENTS

| | | | | |
|---|---|---|---|---|
| JP | 4-151122 A | 5/1992 | | |
| JP | 9-105945 A | 4/1997 | | |
| JP | 11-242230 A | 9/1999 | | |
| JP | 11242230 A | * 9/1999 | ............ G02F 1/1339 | |
| JP | 2002-372717 A | 12/2002 | | |
| JP | 2007-171219 A | 7/2007 | | |

* cited by examiner

*Primary Examiner* — Donald Raleigh
(74) *Attorney, Agent, or Firm* — Keating & Bennett, LLP

(57) ABSTRACT

Provided is a liquid crystal display device which sufficiently prevents a spacer from coming in contact with pixel portions of opposed substrates, and fully inhibits a light leakage from occurring. A liquid crystal display device of the present invention includes a first substrate, a second substrate, a liquid crystal layer interposed between both of the substrates, and a spacer holding a gap between the first substrate and the second substrate, the spacer being configured by laminating a first spacer and a second spacer, the first substrate including the first spacer, the second substrate including the second spacer, each of the first spacer and the second spacer being slender in a plan view of a main surface of each of the substrates, the liquid crystal display device being configured by bonding the first substrate and the second substrate, the first spacer and the second spacer intersecting with each other.

19 Claims, 12 Drawing Sheets

External force is locally applied.

Vector of external force

LIQUID CRYSTAL DISPLAY DEVICE

TECHNICAL FIELD

The present invention relates to a liquid crystal display device. More specifically, the present invention relates to a liquid crystal display device including a columnar spacer for holing a gap between a pair of opposed substrates and serving to sufficiently prevent the columnar spacer from coming in contact with pixel portions of the opposed substrates even if a liquid crystal panel is flexed.

BACKGROUND ART

The liquid crystal display device is configured with a liquid crystal display element interposed between a pair of glass substrates or the like, makes the best of features, for example, a thin type, a light weight and low power consumption, and is used for mobile application, various monitors, televisions and the like which are indispensable to daily life or business. In recent years, the liquid crystal display device is widely employed for usage of electronic books, picture frames, IA (industrial equipment), PC (personal computer), tablet PCs, smartphones and the like.

The liquid crystal display device is generally configured by bonding a pair of substrates including a pixel electrode, an alignment film and the like formed thereon to each other with use of a thermohardening or UV (ultraviolet) hardening sealing material or the like. Moreover, there is executed a method of disposing a bead spacer having a predetermined diameter between a pair of opposed substrates or forming a plurality of columnar spacers between the substrates in order to hold a gap between the substrates and to make the gap uniform.

Referring to the bead spacer, there is caused a problem in that minute bright spots are caused by bead condensation on a pixel electrode, damage caused by a bead is generated through a vibration and a light leakage occurs, resulting in deterioration in image quality. Consequently, there is disclosed a liquid crystal display device capable of remedying the failures occurring due to the bead spacer on a pixel electrode by disposing the bead spacer on a signal line in a longitudinal direction and/or a signal line in a transverse direction on the substrate through an ink-jet method (for example, see Patent Literature 1).

Referring to a columnar spacer including colored layers superimposed thereon, a sufficient overlapping part of the colored layers cannot be obtained because of a problem of exposure precision or the like in some cases. An overlapping area of the column is varied. For this reason, a variation in a column strength occurs so that there is caused a problem in that gap unevenness is caused. Consequently, there is disclosed a liquid crystal display device capable of maintaining a spacer area to be reduced while sufficiently ensuring a column strength by disposing a first layer laminated on a substrate and a second layer on the first layer to intersect as seen in a plan view (for example, see Patent Literature 2).

CITATION LIST

Patent Literature

Patent Literature 1: JP 2002-372717 A
Patent Literature 2: JP 2007-171219 A

SUMMARY OF INVENTION

Technical Problem

Referring to a spacer disposed in a light shielding region, there is the following problem. More specifically, when the spacer is shifted by flexure of a liquid crystal panel, the spacer itself influences display or the spacer rubs an alignment film on pixel portions of opposed substrates, resulting in occurrence of a defect of the alignment film (a damage of the alignment film) and a light leakage caused thereby (for example, when a spacer [a photo spacer (PS) on a color filter (CF) substrate side] 2015 is shifted in a direction of an arrow in FIG. 26, a light leakage 2624 shown in a central part of FIG. 27 occurs).

Herein, the flexure of the liquid crystal panel will be described. Referring to the flexure of the liquid crystal panel shown in FIG. 28, for example, external force Δf is locally applied to a display region (for example, a display region 2722 in FIG. 28) of a large-sized liquid crystal panel so that glass is deformed as shown in FIG. 30 through a work for lifting the liquid crystal panel from a lower surface (for example, a TFT substrate 2802 in FIG. 29) by a hand and putting the liquid crystal panel on a stage (which will be hereinafter referred to as handling) as shown in FIG. 29. In this case, a bonding shift of the substrates is caused with the external force Δf. Consequently, a spacer in the liquid crystal panel (for example, a photo spacer (PS) on a CF substrate side [not shown]) rubs an alignment film on opposed substrate sides (for example, a TFT substrate 2902 in FIG. 30) by force of Δfx. Thus, a damage of the alignment film occurs and a light leakage is caused thereby. The handling is regularly carried out in the case in which a polarizing plate and a mounting driver are bonded or their rework is performed.

Referring to an amount of flexure of the liquid crystal panel, moreover, an amount of deformation of the glass is increased with increase in a size of the liquid crystal panel. For example, referring to a large-sized liquid crystal panel of at least 60 inch, there is sometimes taken a countermeasure for increasing a width of a black matrix to be a light shielding region in order to avoid influence of the spacer itself protruded to a pixel portion on display, a damage of an alignment film and a light leakage caused thereby (in order to prevent them from being seen) due to the flexure of the liquid crystal panel. For example, in the case of a 60-inch large-sized liquid crystal panel, there is observed the damage of the alignment film protruded from the black matrix (for example, a width of 40 μm) to both sides by 10 μm. In this case, there is sometimes taken a countermeasure for increasing the width of the black matrix to 60 μm in order to avoid the damage of the alignment film and the light leakage caused thereby (in order to prevent them from being seen). Consequently, an aperture ratio of the liquid crystal panel is reduced by approximately 3%. In some cases in which a large-sized liquid crystal panels of the 60 inch or more are included, moreover, the aperture ratio of the liquid crystal panel is reduced by approximately 10%.

Referring to small and medium-sized liquid crystal panels, furthermore, external force is locally applied to display regions of the liquid crystal panels so that glass is deformed when the display regions of the liquid crystal panels are rubbed with a pen or are pushed with a finger. In this case, the spacer in the liquid crystal panel rubs the alignment film on the opposed substrate sides so that the alignment film is damaged and the light leakage is caused by the damage. Also in the case in which the glass has a small thickness (for example, 0.2 mm), moreover, the glass is apt to be deformed. For this reason, the alignment film is apt to be damaged and the light leakage tends to be caused by the damage (for example, a size with protrusion from the black matrix to both sides by several μm).

The Patent Literature 1 discloses the means for solving the problem related to the damage caused by the bead spacer existing on the pixel electrode through the vibration and the light leakage. However, the technology described in the Patent Literature 1 is not linked to the solution of the problem related to the damage of the alignment film caused by the columnar spacer disposed in the light shielding region through the flexure of the liquid crystal panel and the light leakage occurring due to the damage.

Moreover, the technology described in the Patent Literature 2 includes the structure in which the first layer and the second layer of the spacer are provided on the same substrate to intersect with each other in a plan view of a main surface of the substrate. However, there is some room for better solution of the problem related to the damage of the alignment film caused by the spacer due to the flexure of the liquid crystal panel and the light leakage occurring due to the damage.

In view of the above state of the art, it is an object of the present invention to provide a liquid crystal display device for sufficiently preventing influence of a spacer itself on display and contact of the spacer with pixel portions of opposed substrates even if a liquid crystal panel is flexed.

Solution to Problem

The present inventor made various investigations concerning the liquid crystal display device for sufficiently preventing the contact of the spacer with the pixel portions of the opposed substrates even if the liquid crystal panel is flexed. Consequently, the present inventor has noted a liquid crystal display device including a spacer holding a gap between a first substrate and a second substrate which are opposed to each other, in which the spacer is configured by laminating a first spacer and a second spacer, the first substrate includes the first spacer, the second substrate includes the second spacer, each of the first spacer and the second spacer is slender in a plan view of a main surface of each of the substrates, and the first substrate and the second substrate are bonded to each other in such a manner that the first spacer and the second spacer intersect with each other. The present inventor found that it is possible to realize a liquid crystal display device capable of sufficiently preventing influence of the respective spacers on display due to protrusion to a pixel portion and contact with the pixel portions of the opposed substrates and fully inhibiting occurrence of a damage of an alignment film and a light leakage caused by the damage as shown in FIG. 2 even if the substrate is flexed through the bond of the first substrate and the second substrate in such a manner that the first spacer provided in the first substrate and the second spacer provided in the second substrate intersect with each other, and resulted in the fact that the problems can be solved perfectly. These findings have now led to completion of the present invention.

By bonding the first substrate and the second substrate to each other in such a manner that the first spacer and the second spacer intersect with each other, it is possible to cause a contact area between the first spacer and the second spacer to be substantially equal for each spacer even if a contact position between the first spacer and the second spacer is shifted. Thus, it is possible to uniformly disperse a load applied to a liquid crystal panel. Consequently, it was found that the balance of strength in a panel plane can be improved.

Moreover, each of the first spacer and the second spacer can be caused to take a slender shape in a plan view of the main surface of each of the substrates. Consequently, it is possible to place the spacers in overlapping with a bus line and a black matrix. Therefore, it was found that the aperture ratio of the liquid crystal panel can be prevented from being reduced.

More specifically, an aspect of the present invention is directed to a liquid crystal display device including a first substrate, a second substrate, a liquid crystal layer interposed between both of the substrates, and a spacer holding a gap between the first substrate and the second substrate, the spacer being configured by laminating a first spacer and a second spacer, the first substrate including the first spacer, the second substrate including the second spacer, each of the first spacer and the second spacer being slender in a plan view of a main surface of each of the substrates, the liquid crystal display device being configured by bonding the first substrate and the second substrate, the first spacer and the second spacer intersecting with each other.

In the liquid crystal display device according to the present invention, bar-shaped spacers are usually disposed to lie along the main surface of the substrate as the first spacer and the second spacer, and both of the spacers thus disposed form a gap between the first substrate and the second substrate and function as the spacers. In this specification, the spacer configured by laminating the first spacer and the second spacer is also referred to as a columnar spacer. The first spacer and the second spacer are usually disposed in opposed positions to each other. Moreover, it is particularly preferable that the first spacer and the second spacer should be orthogonal to each other in a plan view of the main surface of each of the substrates as will be described below. Furthermore, each of the first substrate and the second substrate includes an insulating substrate and a member provided on the insulating substrate. Usually, one of the first substrate and the second substrate functions as a TFT substrate including a bus line and the other functions as a CF substrate including a black matrix.

The configuration of the liquid crystal display device according to the present invention is not especially limited by other components as long as it essentially includes such components.

Another preferred embodiment of the liquid crystal display device according to the present invention will be described below. Various configurations of the liquid crystal display device according to the present invention can be combined properly.

In the liquid crystal display device according to the present invention, it is preferable that each of the first spacer and the second spacer should be composed of a resist.

In the case in which the structure of the liquid crystal display device according to the present invention represents that the first substrate includes the first spacer and the second substrate includes the second spacer, and the first substrate and the second substrate are bonded to each other to realize the liquid crystal display device, the following is taken as an example.

First of all, as a first case, it is preferable that an alignment film should be formed between the first spacer and the second spacer.

The reason is as follows. In a liquid crystal panel, generally, a step of applying the alignment film to each of the substrates is provided as a previous processing step of bonding a pair of opposed substrates. When the alignment film is applied onto a certain substrate (onto a surface) including a bar-shaped spacer formed thereon, the alignment film is formed on a surface at an opposite side to the substrate side (the surface side) of the spacer. In the case of a liquid crystal display device including the first substrate including the first spacer and the second spacer disposed on the first spacer to intersect therewith in a plan view of a main surface of the substrate and obtained by applying the alignment film to the first substrate and the second substrate including no spacer and then bonding them together like the liquid crystal display device described in the Patent Literature 2, the alignment film is not formed between the first spacer and the second spacer.

As a second case, next, it is preferable that the first spacer and the second spacer should take a shape of a bar extended along the first substrate and the second substrate and an unbent shape.

The reason is as follows. In the case in which the bar-shaped spacer is formed on a certain substrate (on a surface), generally, it is formed along a concavo-convex shape on the substrate (on the surface). In the case of a liquid crystal display device including the first substrate including the first spacer and the second spacer disposed on the first spacer to intersect therewith in a plan view of a main surface of the substrate and obtained by bonding the first substrate and the second substrate including no spacer together like the liquid crystal display device described in the Patent Literature 2, the first spacer takes a shape of a bar extended along the first substrate and is not bent, but the second spacer is not extended along the second substrate and is bent along the first spacer.

As a third case, subsequently, it is preferable that the first spacer should not be in contact with the second substrate and the second spacer should not be in contact with the first substrate.

The reason is as follows. In the case in which the bar-shaped spacer is formed on a certain substrate (on a surface), generally, it is formed along a concavo-convex shape on the substrate (on the surface) in the same manner as described above. In the case of a liquid crystal display device including the first substrate including the first spacer and the second spacer disposed on the first spacer to intersect therewith in a plan view of a main surface of the substrate and obtained by bonding the first substrate and the second substrate including no spacer together like the liquid crystal display device described in the Patent Literature 2, the first spacer is not in contact with the second substrate, but the second spacer is bent along the first spacer and is in contact with the first substrate.

Therefore, the structures as described above include the first substrate including the first spacer and the second substrate including the second spacer and are obtained by bonding the first substrate and the second substrate together. This is represented as the structure of the liquid crystal display device according to the present invention.

Next, description will be given to the case in which the contact position of the first spacer and the second spacer is shifted in the liquid crystal display device according to the present invention. In the case in which the first spacer and the second spacer are orthogonal to each other in a plan view of a main surface of each of the substrates, a contact area between the first spacer and the second spacer is not changed and the first spacer and the second spacer are in contact with each other even if the contact position between the first spacer and the second spacer is shifted in XY directions (in a plane of a liquid crystal panel). Therefore, it is possible to uniformly disperse a load applied to the liquid crystal panel.

Also in the case in which the first spacer and the second spacer are not orthogonal to each other in a plan view of a main surface of each of the substrates, moreover, the contact area between the first spacer and the second spacer is not changed and the first spacer and the second spacer are in contact with each other even if the contact position between the first spacer and the second spacer is shifted in the XY directions (in the plane of the liquid crystal panel). Therefore, it is possible to uniformly disperse the load applied to the liquid crystal panel.

In the case in which the first spacer and the second spacer are/are not orthogonal to each other as described above in a plan view of a main surface of each of the substrates, therefore, it is possible to obtain an effect for uniformly dispersing the load applied to the liquid crystal panel even if the contact position between the first spacer and the second spacer is shifted in the XY directions (in the plane of the liquid crystal panel).

In consideration of an amount of the shift in the XY directions (in the plane of the liquid crystal panel), it is possible to reduce lengths of the first spacer and the second spacer more greatly in the case in which the first spacer and the second spacer are orthogonal to each other in a plan view of the main surface of each of the substrates. Thus, it is possible to increase an aperture ratio with respect to a rectangular pixel portion (an opening portion taking a rectangular shape). Accordingly, it is more preferable that the first spacer and the second spacer should be orthogonal to each other in a plan view of the main surface of each of the substrates. Above all, it is particularly preferable that the first spacer and the second spacer should be orthogonal to each other in a plan view of the main surface of each of the substrates in a liquid crystal display device in which pixel portions are arranged in a stripe shape.

Also in the case in which the first spacer and the second spacer are not orthogonal to each other in a plan view of a main surface of each of the substrates, however, it is possible to increase the aperture ratio for a pixel portion in which a gate bus line and a source bus line are not orthogonal to each other, for example, a v-shaped pixel portion (an opening portion taking a v shape).

The shift direction of the contact position between the first spacer and the second spacer has been described as the XY directions (in the plane of the liquid crystal panel). Also when a positional shift in which one of the substrates is rotated by an angle $\theta$ (hereinafter referred to as a positional shift of $\theta$ rotation) is caused at the time of bonding the substrates, the contact area between the first spacer and the second spacer is substantially equal for each spacer. For this reason, a direction of the $\theta$ rotation is also included in the shift direction of the contact position between the first spacer and the second spacer. In other words, it is possible to uniformly disperse the load applied to the liquid crystal panel even if the positional shift of the $\theta$ rotation of the substrate is caused.

Next, description will be given to the numbers of the first spacer and the second spacer in the liquid crystal display device according to the present invention. First of all, in the case in which the spacer is configured from a single first spacer and a single second spacer and the first substrate and the second substrate are bonded to each other such that the first spacer and the second spacer intersect with each other, the contact area between the first spacer and the second spacer is not changed and the first spacer and the second spacer are in contact with each other even if the contact position between the first spacer and the second spacer is shifted. Therefore, it is possible to uniformly disperse the load applied to the liquid crystal panel.

In the case in which the spacer is configured from a plurality of first spacers and a single second spacer or a single first spacer and a plurality of second spacers, similarly, the contact area between the first spacer and the second spacer is not changed and the first spacer and the second spacer are in contact with each other even if the contact position between the first spacer and the second spacer is shifted. Therefore, it is possible to uniformly disperse the load applied to the liquid crystal panel. In this specification, it is preferable that the respective first spacers should form a single linear spacer when they are moved in parallel in a certain direction. The same goes for the second spacer.

Also in the case in which the spacer is configured from the plurality of first spacers and the plurality of second spacers, moreover, the same effects as in the above case can be obtained. For this reason, the numbers of both the first spacers and the second spacers may be two or more.

Next, description will be given to arrangement of the first spacer and the second spacer in the liquid crystal display device according to the present invention. It is preferable that one of the first substrate and the second substrate should include a bus line formed linearly in a display region and the other should include a black matrix, and one of the first spacer and the second spacer should be disposed along the bus line and the other should be disposed along the black matrix. In this specification, "the spacer is disposed along the bus line" means that the spacer is disposed to overlap the bus line in substantial parallel with an edge of the bus line. The same goes for "the spacer is disposed along the black matrix". In the case in which the spacer provided on the TFT substrate side is disposed along a gate bus line and the spacer provided on the CF substrate side is disposed along a source bus line and the case in which the spacer provided on the TFT substrate side is disposed along the source bus line and the spacer provided on the CF substrate side is disposed along the gate bus line, reduction in a contrast does not occur and unevenness is not caused by a light leakage as long as the first spacer and the second spacer are included in the light shielding region when the contact position between the first spacer and the second spacer is shifted.

When the number of at least one of the first spacer and the second spacer is two or more and a plurality of first spacers are disposed in parallel with each other and/or a plurality of second spacers are disposed in parallel with each other, moreover, the first spacer(s) and the second spacer(s) are in contact with each other even if the contact position(s) between the first spacer(s) and the second spacer(s) is/are shifted in the same manner as in the case in which the first spacers are not disposed in parallel with each other and the second spacers are not disposed in parallel with each other. Therefore, it is possible to uniformly disperse the load applied to the liquid crystal panel. However, the first spacer and the second spacer are disposed efficiently in the light shielding region to suppress reduction in an aperture ratio. For this reason, it is preferable that the plurality of first spacers should be disposed in parallel with each other and the plurality of second spacers should also be disposed in parallel with each other.

By disregarding the influence of reduction in a contrast and in the aperture ratio, it is also possible to dispose the first spacer and the second spacer in pixels. In this case, there is an advantage that display unevenness is hardly caused by a bonding shift of the upper and lower substrates.

From a viewpoint of the aperture ratio of the liquid crystal panel, furthermore, the present invention is more effective for a large-sized liquid crystal panel. For example, in the case of a 60-inch large-sized liquid crystal panel, it is possible to reduce the width of the black matrix to be the light shielding region provided conventionally by employing the present invention. Therefore, the aperture ratio can be improved by approximately 3%. In some cases of a large-sized liquid crystal panel of 60 inch or more, the aperture ratio can be improved by approximately 10%. The present invention is also effective for small and medium-sized liquid crystal panels. In this case, however, the aperture ratio is rarely improved. From a viewpoint of the improvement in the aperture ratio of the liquid crystal panel, therefore, it is preferable that the liquid crystal panel should be large-sized (for example, 60 inch or more).

Next, it is preferable that the first spacer and the second spacer should have lengths which are equal to or smaller than a length of a short side of a pixel in the liquid crystal display device according to the present invention. In the case in which the lengths of the first spacer and the second spacer exceed the length of the short side of the pixel, it is impossible to sufficiently ensure a liquid crystal injection path in liquid crystal injection through vacuum injection or a dropping method. As a result, a portion (black spot) with which a liquid crystal cannot be filled is generated. In the present invention, moreover, it is preferable that the first spacer and the second spacer should be disposed in a light shielding region (an intersecting part of the bus line and the black matrix) in a part of the pixel portion away from the same bus line and the same black matrix line in order to sufficiently ensure the liquid crystal injection path.

In the liquid crystal display device according to the present invention, it is preferable that the thicknesses of the first spacer and the second spacer should be equal to each other. In the liquid crystal display device according to the present invention, furthermore, it is preferable that the widths of the first spacer and the second spacer should be equal to each other. Consequently, it is possible to cause the strengths of the first spacer and the second spacer to be equal to each other, thereby dispersing the load applied to the liquid crystal panel uniformly.

In the liquid crystal display device according to the present invention, it is preferable that the contact area between the first spacer and the second spacer should be substantially equal for each spacer. This is intended for uniformly dispersing the load applied to the liquid crystal panel. Consequently, it is possible to maintain the strength of the liquid crystal panel.

Quantitative values for the numbers, arrangements, widths and the like of the first spacer and the second spacer are properly defined corresponding to the size of the panel and that of the pixel in consideration of measurement results such as cell thickness unevenness caused by a pressing pressure of the liquid crystal panel, an alignment return time after the pressing (pooling) and a range of an area disturbed in alignment with application of a vibration (flushing) and the like.

The aforementioned modes may be employed in appropriate combination as long as the combination is not beyond the spirit of the present invention.

Advantageous Effects of Invention

According to the present invention, it is possible to provide a liquid crystal display device which sufficiently prevents a spacer from coming in contact with pixel portions of opposed substrates even if a liquid crystal panel is flexed and fully inhibits an alignment film from being rubbed and a light leakage from occurring therewith.

DESCRIPTION OF EMBODIMENTS

Figure 1:
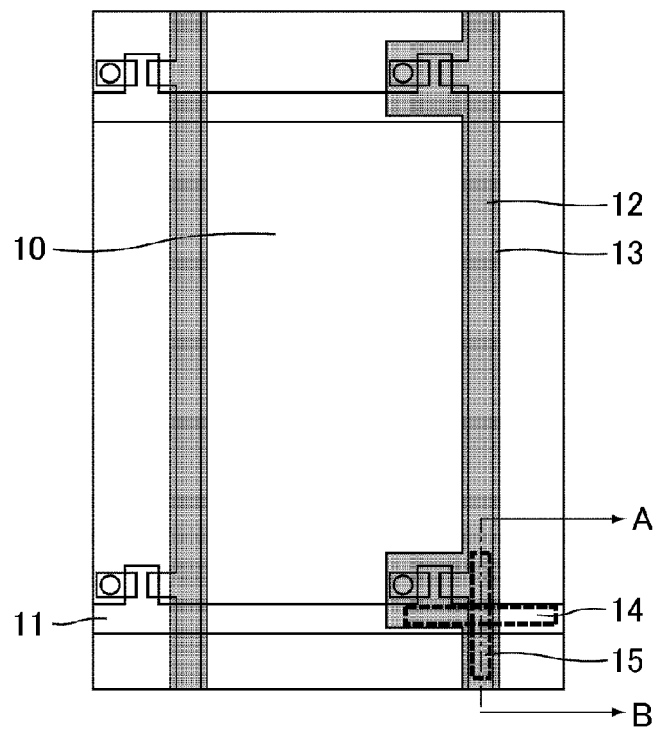
FIG. 1 is a schematic plan view showing a spacer provided in a liquid crystal display device according to Embodiment 1 and a periphery thereof which are enlarged.

The present invention will be mentioned in more detail referring to the drawings in the following embodiments, but is not limited to these embodiments. In the present embodiment, the first substrate is set to be a TFT substrate, the second substrate is set to be a CF substrate, and each of the first spacer and the second spacer is set to be a photo spacer (hereinafter referred to as a "PS"), and the each PS takes a slender shape in a plan view of a main surface of each of the substrates. Moreover, the each PS takes a sectional shape of an almost trapezoid which is rounded and the trapezoidal shape includes a structure in which a lower bottom is larger than an upper bottom and the lower bottom is in contact with the substrate.

Embodiment 1

Embodiment in Which Spacer is Configured from Single PS on TFT Substrate Side and Single PS on CF Substrate Side The spacer is configured from a single PS on the TFT substrate side and a single PS on the CF substrate side, and the TFT substrate and the CF substrate are bonded to each other in such a manner that the PS on the TFT substrate side and the PS on the CF substrate side intersect with each other.

A basic structure of a liquid crystal display device according to Embodiment 1 includes a TFT substrate, a CF substrate, a liquid crystal layer interposed between both of the substrates, and a spacer holding a gap between the TFT substrate and the CF substrate. Moreover, a display mode of the liquid crystal display device according to Embodiment 1 is not particularly restricted, and it is possible to employ a TN (Twisted Nematic) mode, an MVA (Multi-Domain Vertical Alignment) mode, an IPS (In-Plane Switching) mode, an FFS (Fringe Field Switching) mode or a TBA (Transverse Bend Alignment) mode, for example. Furthermore, it is possible to suitably apply the liquid crystal display device to a PSA (Polymer Sustained Alignment) technique or a photo alignment technique. In addition, a shape of a pixel is not restricted, and a vertically long pixel, a horizontally long pixel, a v-shaped pixel or a delta array may be used as the pixel.

Figure 2:
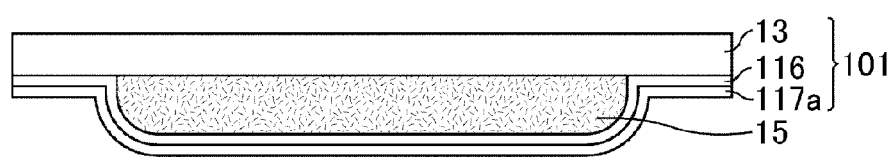
FIG. 2 is a schematic cross-sectional view showing a section of a portion corresponding to a line A-B in FIG. 1.
Figure 2:
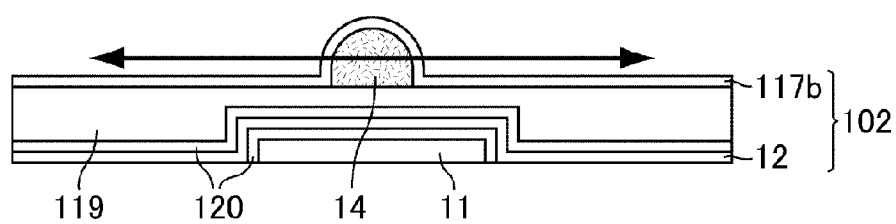

FIG. 1 is a schematic plan view showing a spacer provided in a liquid crystal display device according to Embodiment 1 and a periphery thereof which are enlarged. FIG. 2 is a schematic cross-sectional view showing a section of a portion corresponding to a line A-B in FIG. 1. In Embodiment 1, a PS 14 on a TFT substrate side is disposed along a gate bus line 11 and a PS 15 on a CF substrate side is disposed on a black matrix 13 along a source bus line 12. Consequently, even if a contact position between the PS 14 on the TFT substrate side and the PS 15 on the CF substrate side is shifted greatly in a direction of an arrow, for example, the PS 14 on the TFT substrate side does not come in contact with an alignment film 117a (a display opening portion) on a pixel portion of an opposed substrate and the PS 15 on the CF substrate side does not come in contact with an opposed alignment film 117b (a display opening portion). Thus, it is possible to sufficiently prevent the alignment film from being damaged, resulting in nonoccurrence of a light leakage. In addition, it is also possible to sufficiently prevent influence of the spacer itself protruded to the pixel portion on display. Accordingly, it is not necessary to enlarge a light shielding region in order to prevent the light leakage. Thus, the light shielding region can be reduced. Therefore, an aperture ratio can be increased. In Embodiment 1, moreover, a contact area between the PS 14 on the TFT substrate side and the PS 15 on the CF substrate side is substantially equal for each spacer. For this reason, a load applied to a liquid crystal panel can be dispersed uniformly, which is effective. Although the contact area between the PS on the TFT substrate side and the PS on the CF substrate side is not particularly restricted, it is preferable that the contact area should be equal to or greater than 4 $\mu m^2$ and be equal to or smaller than 40 $\mu m^2$.

Example 1-1

Figure 3:
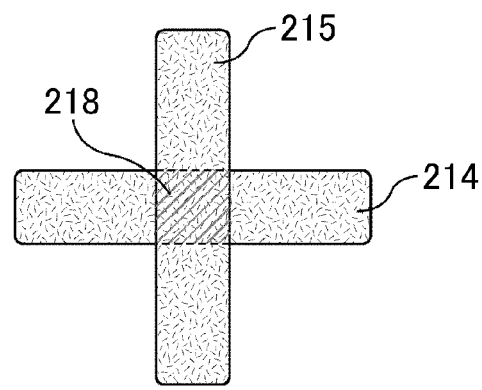
FIG. 3 is a schematic plan view showing arrangement of a spacer provided in a liquid crystal display device according to Example 1-1.
Figure 4:
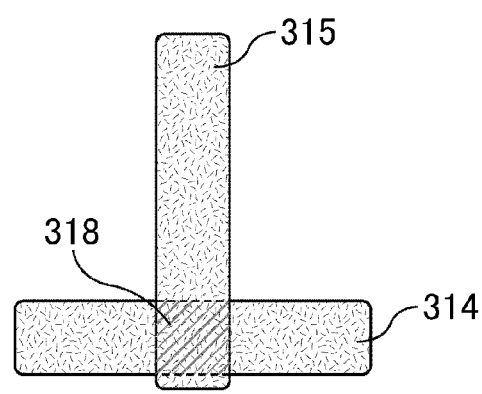
FIG. 4 is a schematic plan view showing a state in the case in which a contact position of the spacer is shifted from the state in FIG. 3.

Structure in which PS on TFT Substrate Side and PS on CF Substrate Side are Orthogonal to Each Other in a Plan View of Main Surface of Each of Substrates FIG. 3 is a schematic plan view showing arrangement of a spacer provided in a liquid crystal display device according to Example 1-1. FIG. 4 is a schematic plan view showing a state in the case in which a contact position of the spacer is shifted from the state in FIG. 3. Example 1-1 provides a structure in which the PS on the TFT substrate side and the PS on the CF substrate side are orthogonal to each other in a plan view of the main surface of each of the substrates.

In the liquid crystal display device according to Example 1-1, even if a contact position between a PS 214 on the TFT substrate side and a PS 215 on the CF substrate side in FIG. 3 is shifted to a contact position between a PS 314 on the TFT substrate side and a PS 315 on the CF substrate side in FIG. 4, the PS 314 on the TFT substrate side and the PS 315 on the CF substrate side are maintained in contact with each other, and a contact area 218 between the PS 214 on the TFT substrate side and the PS 215 on the CF substrate side is equal to a contact area 318 between the PS 314 on the TFT substrate side and the PS 315 on the CF substrate side. In the case shown in FIG. 4, accordingly, a load applied to a liquid crystal panel can be dispersed uniformly in the same manner as in the case of FIG. 3. Thus, the PS does not tend to be locally crushed. The PS 214 and the PS 314 may be provided on the CF substrate side, and the PS 215 and the PS 315 may be provided on the TFT substrate side.

Example 1-2

Figure 5:
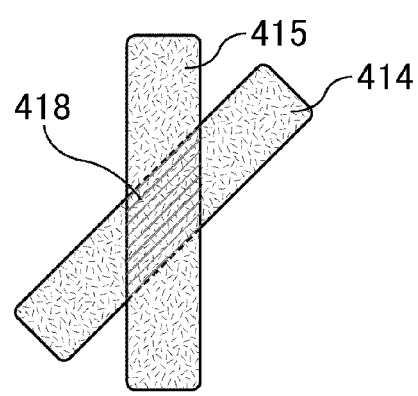
FIG. 5 is a schematic plan view showing arrangement of a spacer provided in a liquid crystal display device according to Example 1-2.
Figure 6:
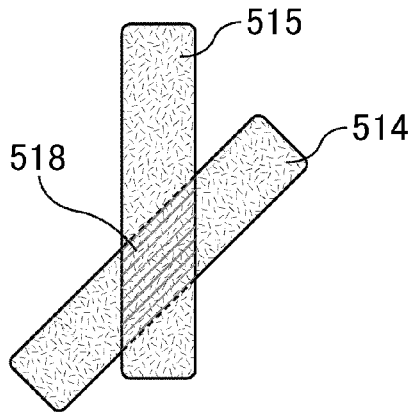
FIG. 6 is a schematic plan view showing a state in the case in which a contact position of the spacer is shifted from the state in FIG. 5.

Structure in which PS on TFT Substrate Side and PS on CF Substrate Side are not Orthogonal to Each Other in a Plan View of Main Surface of Each of Substrates FIG. 5 is a schematic plan view showing arrangement of a spacer provided in a liquid crystal display device according to Example 1-2. FIG. 6 is a schematic plan view showing a state in the case in which a contact position of the spacer is shifted from the state in FIG. 5. Example 1-2 provides a structure in which the PS on the TFT substrate side and the PS on the CF substrate side are not orthogonal to each other in a plan view of the main surface of each of the substrates.

In the liquid crystal display device according to Example 1-2, even if a contact position between a PS 414 on the TFT substrate side and a PS 415 on the CF substrate side in FIG. 5 is shifted to a contact position between a PS 514 on the TFT substrate side and a PS 515 on the CF substrate side in FIG. 6, the PS 514 on the TFT substrate side and the PS 515 on the CF substrate side are maintained in contact with each other, and a contact area 418 between the PS 414 on the TFT substrate side and the PS 415 on the CF substrate side is equal to a contact area 518 between the PS 514 on the TFT substrate side and the PS 515 on the CF substrate side. In the case shown in FIG. 6, accordingly, a load applied to a liquid crystal panel can be dispersed uniformly in the same manner as in the case of FIG. 5. The PS 414 and the PS 514 may be provided on the CF substrate side, and the PS 415 and the PS 515 may be provided on the TFT substrate side.

Example 1-3

Structure in which PS on TFT Substrate Side and PS on CF Substrate Side are not Orthogonal to Each Other in a Plan View of Main Surface of Each of Substrates and Angle Formed by PS on TFT Substrate Side and PS on CF Substrate Side is Different from that in Example 1-2

Figure 7:
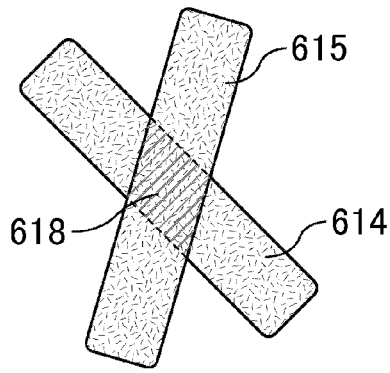
FIG. 7 is a schematic plan view showing arrangement of a spacer provided in a liquid crystal display device according to Example 1-3.
Figure 8:
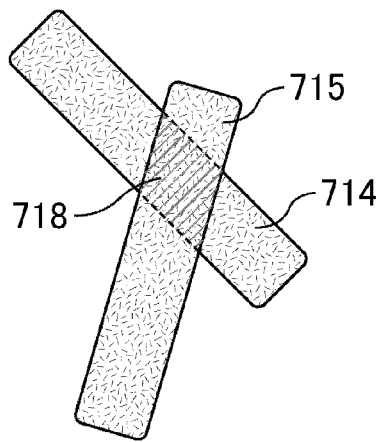
FIG. 8 is a schematic plan view showing a state in the case in which a contact position of the spacer is shifted from the state in FIG. 7.

FIG. 7 is a schematic plan view showing arrangement of a spacer provided in a liquid crystal display device according to Example 1-3. FIG. 8 is a schematic plan view showing a state in the case in which a contact position of the spacer is shifted from the state in FIG. 7. Example 1-3 provides a structure in which the PS on the TFT substrate side and the PS on the CF substrate side are not orthogonal to each other in a plan view of the main surface of each of the substrates and an angle formed by the PS on the TFT substrate side and the PS on the CF substrate side is different from that in Example 1-2.

In the liquid crystal display device according to Example 1-3, even if a contact position between a PS 614 on the TFT substrate side and a PS 615 on the CF substrate side in FIG. 7 is shifted to a contact position between a PS 714 on the TFT substrate side and a PS 715 on the CF substrate side in FIG. 8, the PS 714 on the TFT substrate side and the PS 715 on the CF substrate side are maintained in contact with each other, and a contact area 618 between the PS 614 on the TFT substrate side and the PS 615 on the CF substrate side is equal to a contact area 718 between the PS 714 on the TFT substrate side and the PS 715 on the CF substrate side. In the case shown in FIG. 8, accordingly, a load applied to a liquid crystal panel can be dispersed uniformly in the same manner as in the case of FIG. 7. The PS 614 and the PS 714 may be provided on the CF substrate side, and the PS 615 and the PS 715 may be provided on the TFT substrate side.

In consideration of an amount of shift in XY directions (vertical and transverse directions in a plane of a liquid crystal panel) in Embodiment 1, the structure according to Example 1-1 is preferable. The reason is as follows. Since the PS is provided along the XY directions more greatly in Example 1-1, the load applied to the liquid crystal panel can be sufficiently dispersed uniformly in the case in which a shift in the XY directions occurs even if the length of the PS is reduced. Consequently, an aperture ratio can be increased for a rectangular pixel portion 10 (including a rectangular opening portion) shown in FIG. 1. Although the lengths of the PS on the TFT substrate side and the PS on the CF substrate side are not particularly restricted, it is preferable that they should be equal to or greater than 25 µm and be equal to or smaller than 150 µm. Although the widths of the PS on the TFT substrate side and the PS on the CF substrate side are not particularly restricted, moreover, it is preferable that they should be equal to or greater than 5 µm and be equal to or smaller than 50 µm.

With the structures according to Example 1-2 and Example 1-3, furthermore, it is possible to increase the aperture ratio for a pixel portion taking a v shape (including an opening portion taking a v shape).

Embodiment 2

Embodiment in which the Number of at Least One of PS on the TFT Substrate Side and PS on the CF Substrate Side is Two or More The number of at least one of the PS on the TFT substrate side and the PS on the CF substrate side configuring the spacer is two or more, and the TFT substrate and the CF substrate are bonded to each other in such a manner that the PS on the TFT substrate side and the PS on the CF substrate side intersect with each other.

A basic structure of a liquid crystal display device according to Embodiment 2 also includes a TFT substrate, a CF substrate, a liquid crystal layer interposed between both of the substrates, and a spacer holding a gap between the TFT substrate and the CF substrate. Moreover, a display mode of the liquid crystal display device according to Embodiment 2 is not particularly restricted (TN, MVA, IPS, FFS, TBA, PSA or a photo alignment technique may be employed, for example). Furthermore, a shape of a pixel is not restricted, and a vertically long pixel, a horizontally long pixel, a v-shaped pixel or a delta array may be used as the pixel.

Figure 9:
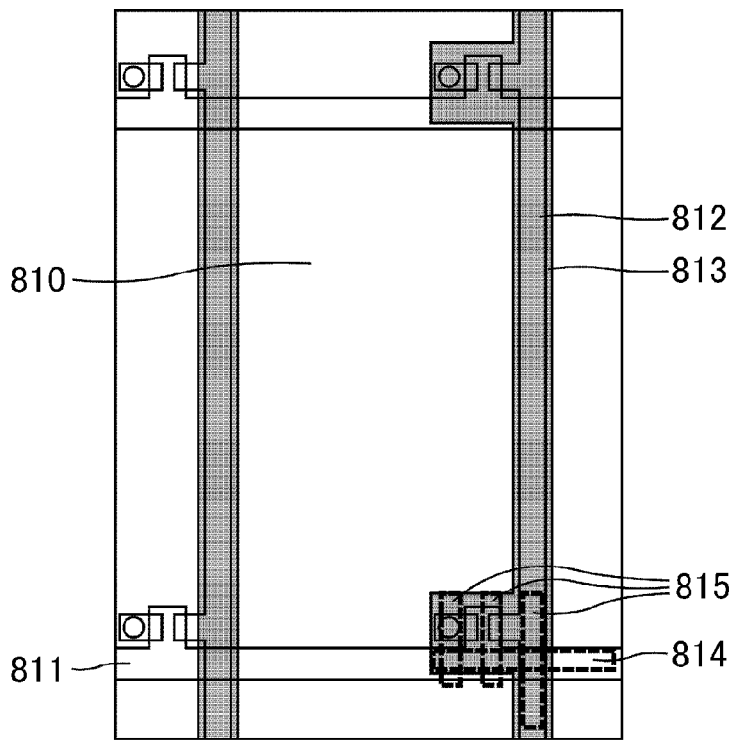
FIG. 9 is a schematic plan view showing a spacer provided in a liquid crystal display device according to Embodiment 2 and a periphery thereof (a rectangular pixel) which are enlarged.
Figure 10:
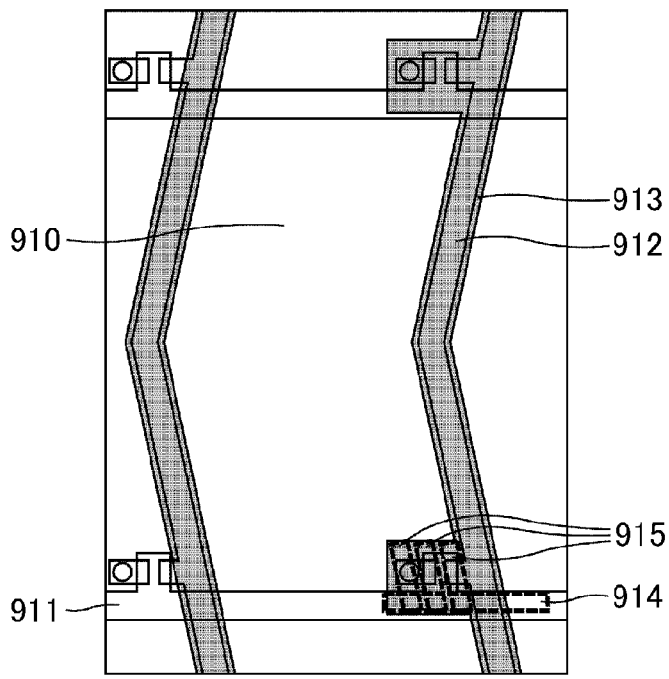
FIG. 10 is a schematic plan view showing a spacer provided in a liquid crystal display device according to a modified example of Embodiment 2 and a periphery thereof (a v-shaped pixel) which are enlarged.

FIG. 9 is a schematic plan view showing a spacer provided in a liquid crystal display device according to Embodiment 2 and a periphery thereof (a rectangular pixel) which are enlarged. FIG. 10 is a schematic plan view showing a spacer provided in a liquid crystal display device according to a modified example of Embodiment 2 and a periphery thereof (a v-shaped pixel) which are enlarged. In Embodiment 2, a PS 814 on a TFT substrate side (a PS 914 on the TFT substrate side) is disposed along a gate bus line 811 (a gate bus line 911) and a PS 815 on a CF substrate side (a PS 915 on the CF substrate side) is disposed along a black matrix 813 (a black matrix 913) in the same manner as in Embodiment 1. Even if a contact position between the PS 814 on the TFT substrate side (the PS 914 on the TFT substrate side) and the PS 815 on the CF substrate side (the PS 915 on the CF substrate side) is shifted greatly, consequently, the PS does not come in contact with an alignment film on a pixel portion of an opposed substrate. Therefore, a light leakage does not occur. In addition, it is also possible to sufficiently prevent influence of the spacer itself protruded to the pixel portion on display. Accordingly, it is not necessary to enlarge a light shielding region in order to prevent the light leakage. Thus, the light shielding region can be reduced. Therefore, an aperture ratio can be increased. In Embodiment 2, moreover, a contact area between the PS 814 on the TFT substrate side (the PS 914 on the TFT substrate side) and the PS 815 on the CF substrate side (the PS 915 on the CF substrate side) is substantially equal for each spacer in the same manner as in Embodiment 1. For this reason, a load applied to a liquid crystal panel can be dispersed uniformly, which is effective. The contact area between the PS on the TFT substrate side and the PS on the CF substrate side is increased more greatly than in Embodiment 1. Consequently, it is possible to obtain a function of a high resistance to the load (a high durability). Although a sum (a total area) of the contact area between the PS on the TFT substrate side and the PS on the CF substrate side for each PS is not particularly restricted, it is preferable that the sum should be equal to or greater than 4 $\mu m^2$ and be equal to or smaller than 40 $\mu m^2$.

Example 2-1

Figure 11:
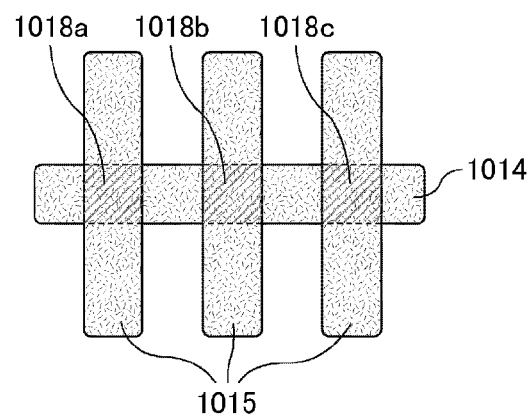
FIG. 11 is a schematic plan view showing arrangement of a spacer provided in a liquid crystal display device according to Example 2-1.
Figure 12:
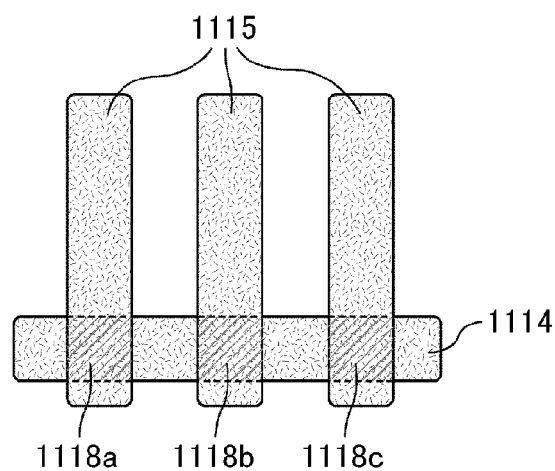
FIG. 12 is a schematic plan view showing a state in the case in which a contact position of the spacer is shifted from the state in FIG. 11.

Structure in which Single PS on TFT Substrate Side and Three PSs on CF Substrate Side are Orthogonal to Each Other in a Plan View of Main Surface of Each of Substrates FIG. 11 is a schematic plan view showing arrangement of a spacer provided in a liquid crystal display device according to Example 2-1. FIG. 12 is a schematic plan view showing a state in the case in which a contact position of the spacer is shifted from the state in FIG. 11. Example 2-1 provides a structure in which a single PS on the TFT substrate side and three PSs on the CF substrate side are orthogonal to each other in a plan view of the main surface of each of the substrates.

In the liquid crystal display device according to Example 2-1, even if a contact position between a PS 1014 on the TFT substrate side and a PS 1015 on the CF substrate side in FIG. 11 is shifted to a contact position between a PS 1114 on the TFT substrate side and a PS 1115 on the CF substrate side in FIG. 12, the PS 1114 on the TFT substrate side and the PS 1115 on the CF substrate side are maintained in contact with each other, and a sum (a total area) of a contact area 1018a, a contact area 1018b and a contact area 1018c between the PS 1014 on the TFT substrate side and the PS 1015 on the CF substrate side is equal to a sum (a total area) of a contact area 1118a, a contact area 1118b and a contact area 1118c between the PS 1114 on the TFT substrate side and the PS 1115 on the CF substrate side. In the case shown in FIG. 12, accordingly, a load applied to a liquid crystal panel can be dispersed uniformly in the same manner as in the case of FIG. 11. The PS 1014 and the PS 1114 may be provided on the CF substrate side, and the PS 1015 and the PS 1115 may be provided on the TFT substrate side.

Example 2-2

Figure 13:
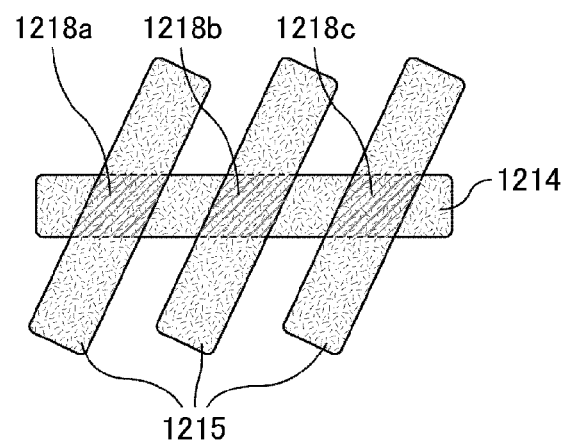
FIG. 13 is a schematic plan view showing arrangement of a spacer provided in a liquid crystal display device according to Example 2-2.
Figure 14:
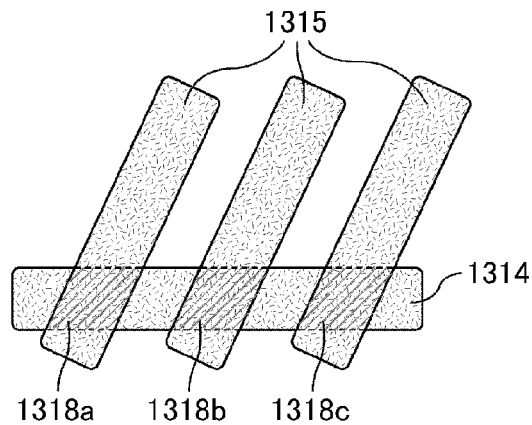
FIG. 14 is a schematic plan view showing a state in the case in which a contact position of the spacer is shifted from the state in FIG. 13.

Structure in which Single PS on TFT Substrate Side and Three PSs on CF Substrate Side are Not Orthogonal to Each Other in a Plan View of Main Surface of Each of Substrates FIG. 13 is a schematic plan view showing arrangement of a spacer provided in a liquid crystal display device according to Example 2-2. FIG. 14 is a schematic plan view showing a state in the case in which a contact position of the spacer is shifted from the state in FIG. 13. Example 2-2 provides a structure in which a single PS on the TFT substrate side and three PSs on the CF substrate side are not orthogonal to each other in a plan view of the main surface of each of the substrates.

In the liquid crystal display device according to Example 2-2, even if a contact position between a PS 1214 on the TFT substrate side and a PS 1215 on the CF substrate side in FIG. 13 is shifted to a contact position between a PS 1314 on the TFT substrate side and a PS 1315 on the CF substrate side in FIG. 14, the PS 1314 on the TFT substrate side and the PS 1315 on the CF substrate side are maintained in contact with each other, and a sum (a total area) of a contact area 1218a, a contact area 1218b and a contact area 1218c between the PS 1214 on the TFT substrate side and the PS 1215 on the CF substrate side is equal to a sum (a total area) of a contact area 1318a, a contact area 1318b and a contact area 1318c between the PS 1314 on the TFT substrate side and the PS 1315 on the CF substrate side. In the case shown in FIG. 14, accordingly, a load applied to a liquid crystal panel can be dispersed uniformly in the same manner as in the case of FIG. 13. The PS 1214 and the PS 1314 may be provided on the CF substrate side, and the PS 1215 and the PS 1315 may be provided on the TFT substrate side.

In consideration of an amount of shift in XY directions (vertical and transverse directions in a plane of a liquid crystal panel) in Embodiment 2, the structure according to Example 2-1 is preferable. The reason is as follows. The lengths of the PS on the TFT substrate side and the PS on the CF substrate side can be reduced more greatly in Example 2-1. Consequently, an aperture ratio can be increased for a rectangular pixel portion 810 (including a rectangular opening portion) shown in FIG. 9. Although the lengths of the PS on the TFT substrate side and the PS on the CF substrate side are not particularly restricted, it is preferable that they should be equal to or greater than 25 μm and be equal to or smaller than 150 μm. Although the widths of the PS on the TFT substrate side and the PS on the CF substrate side are not particularly restricted, moreover, it is preferable that they should be equal to or greater than 5 μm and be equal to or smaller than 50 μm.

With the structure according to Example 2-2, furthermore, it is possible to increase the aperture ratio for a pixel portion 910 taking a v shape (including an opening portion taking a v shape) shown in FIG. 10.

Figure 15:
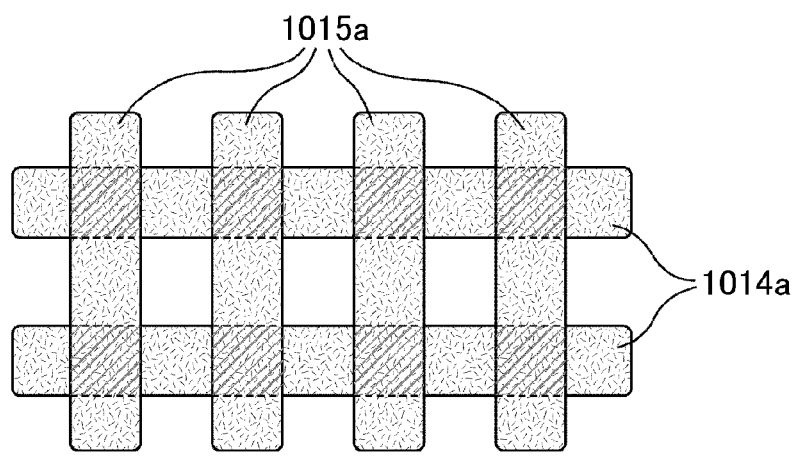
FIG. 15 is a schematic plan view showing arrangement of a spacer provided in a liquid crystal display device according to Example 2-3.
Figure 16:
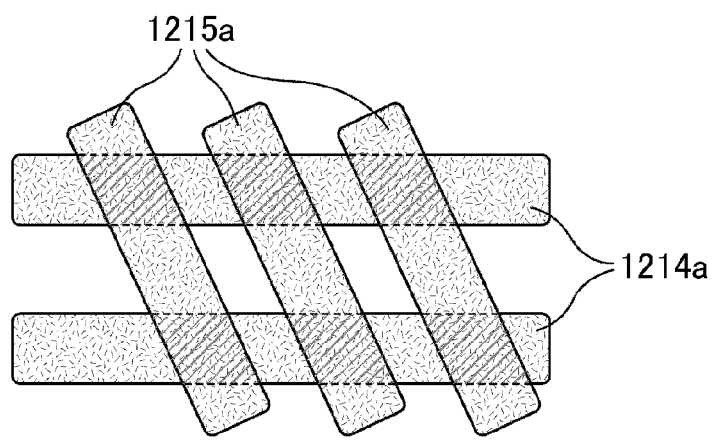
FIG. 16 is a schematic plan view showing arrangement of a spacer provided in a liquid crystal display device according to Example 2-4.

In Example 2-1 and Example 2-2, moreover, there is taken the configuration in which the spacer is configured from the single PS on the TFT substrate side and the three PSs on the CF substrate side. However, the number of the PSs on the TFT substrate side and that of the PSs on the CF substrate side are not particularly restricted, and it is also possible to employ a combination of other numbers (for example, a combination of the PSs on the TFT substrate side and the PSs on the CF substrate side). For example, the following case is applied. FIG. 15 is a schematic plan view showing arrangement of a spacer provided in a liquid crystal display device according to Example 2-3. Example 2-3 provides a structure in which two PSs 1014*a* on the TFT substrate side and four PSs 1015*a* on the CF substrate side are orthogonal to each other in a plan view of the main surface of each of the substrates. FIG. 16 is a schematic plan view showing arrangement of a spacer provided in a liquid crystal display device according to Example 2-4. Example 2-4 provides a structure in which two PSs 1214*a* on the TFT substrate side and three PSs 1215*a* on the CF substrate side are not orthogonal to each other in a plan view of the main surface of each of the substrates. Also in Example 2-3 and Example 2-4, even if a contact position between the PSs 1014*a* on the TFT substrate side (the PSs 1214*a* on the TFT substrate side) and the PSs 1015*a* on the CF substrate side (the PSs 1215*a* on the CF substrate side) is shifted, it is possible to uniformly disperse a load applied to a liquid crystal panel in the same manner as in Example 2-1 and Example 2-2. Moreover, arrangement areas of the spacer in Example 2-3 and Example 2-4 are larger than those of the spacer in Example 2-1 and Example 2-2. The PSs 1014*a* (the PSs 1214*a*) may be provided on the CF substrate side and the PSs 1015*a* (the PSs 1215*a*) may be provided on the TFT substrate side.

Embodiment 3

Embodiment in which Spacer is Configured from Single PS on TFT Substrate Side and at Least One or Two of Three PSs on CF Substrate Side The spacer is configured from a single PS on the TFT substrate side and at least one or two of three PSs on the CF substrate side, and the TFT substrate and the CF substrate are bonded to each other in such a manner that the PS on the TFT substrate side and the PS(s) on the CF substrate side intersect with each other.

A basic structure of a liquid crystal display device according to Embodiment 3 also includes a TFT substrate, a CF substrate, a liquid crystal layer interposed between both of the substrates, and a spacer holding a gap between the TFT substrate and the CF substrate. Moreover, a display mode of the liquid crystal display device according to Embodiment 3 is not particularly restricted (TN, MVA, IPS, FFS, TBA, PSA or a photo alignment technique may be employed, for example). Furthermore, a shape of a pixel is not restricted, and a vertically long pixel, a horizontally long pixel, a v-shaped pixel or a delta array may be used as the pixel.

Figure 17:
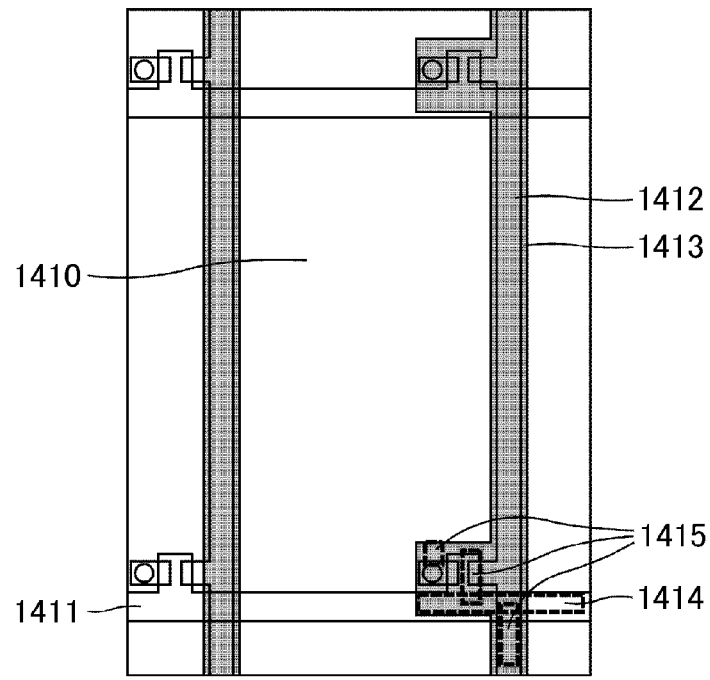
FIG. 17 is a schematic plan view showing a spacer provided in a liquid crystal display device according to Embodiment 3 and a periphery thereof (a rectangular pixel) which are enlarged.
Figure 18:
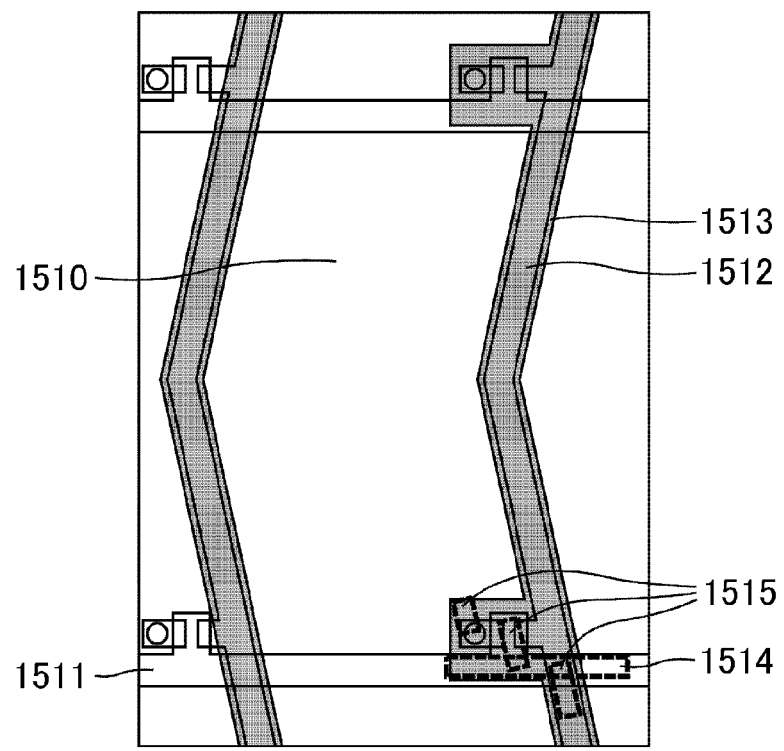
FIG. 18 is a schematic plan view showing a spacer provided in a liquid crystal display device according to a modified example of Embodiment 3 and a periphery thereof (a v-shaped pixel) which are enlarged.

FIG. 17 is a schematic plan view showing a spacer provided in a liquid crystal display device according to Embodiment 3 and a periphery thereof (a rectangular pixel) which are enlarged. FIG. 18 is a schematic plan view showing a spacer provided in a liquid crystal display device according to a modified example of Embodiment 3 and a periphery thereof (a v-shaped pixel) which are enlarged. In Embodiment 3, three PSs are disposed on the CF substrate side, and one of the PSs on the CF substrate side and the PS on the TFT substrate side are disposed in contact with each other or two of the PSs on the CF substrate side and the PS on the TFT substrate side are disposed in contact with each other in such a manner that a contact area between the PSs is constant on the assumption that the contact position between the PSs is shifted. In Embodiment 3, moreover, a PS 1414 on a TFT substrate side (a PS 1514 on the TFT substrate side) is disposed along a gate bus line 1411 (a gate bus line 1511) and a PS 1415 on a CF substrate side (a PS 1515 on the CF substrate side) is disposed along a black matrix 1413 (a black matrix 1513) in the same manner as in Embodiment 1. Even if a contact position between the PS 1414 on the TFT substrate side (the PS 1514 on the TFT substrate side) and the PS 1415 on the CF substrate side (the PS 1515 on the CF substrate side) is shifted greatly, consequently, the PS does not come in contact with an alignment film on a pixel portion of an opposed substrate. Therefore, a light leakage does not occur. In addition, it is also possible to sufficiently prevent influence of the spacer itself protruded to the pixel portion on display. Accordingly, it is not necessary to enlarge a light shielding region in order to prevent the light leakage. Thus, the light shielding region can be reduced. Therefore, an aperture ratio can be increased. In Embodiment 3, moreover, a contact area between the PS 1414 on the TFT substrate side (the PS 1514 on the TFT substrate side) and the PS 1415 on the CF substrate side (the PS 1515 on the CF substrate side) is substantially equal for each spacer in the same manner as in Embodiment 1. For this reason, a load applied to a liquid crystal panel can be dispersed uniformly, which is effective. Although a sum (a total area) of the contact area between the PS on the TFT substrate side and the PS on the CF substrate side is not particularly restricted, it is preferable that the sum should be equal to or greater than 4 $\mu m^2$ and be equal to or smaller than 40 $\mu m^2$.

Example 3-1

Figure 19:
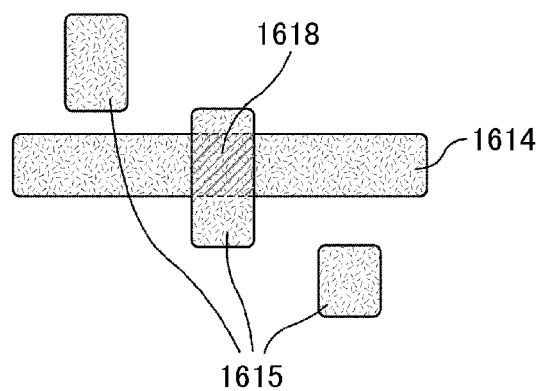
FIG. 19 is a schematic plan view showing arrangement of a spacer provided in a liquid crystal display device according to Example 3-1.
Figure 20:
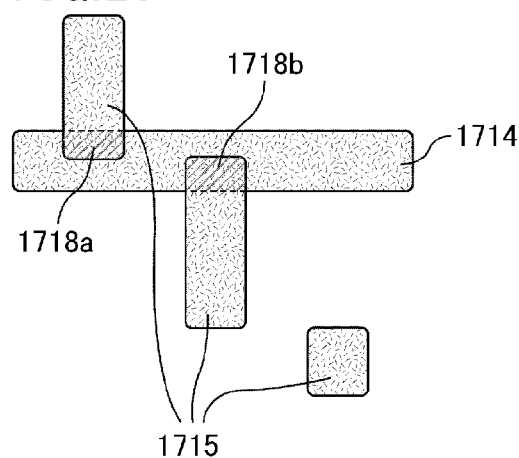
FIG. 20 is a schematic plan view showing a state in the case in which a contact position of the spacer is shifted from the state in FIG. 19.

Structure in which PS on TFT Substrate Side and PS on CF Substrate Side are Orthogonal to Each Other in a Plan View of Main Surface of Each of Substrates FIG. 19 is a schematic plan view showing arrangement of a spacer provided in a liquid crystal display device according to Example 3-1. FIG. 20 is a schematic plan view showing a state in the case in which a contact position of the spacer is shifted from the state in FIG. 19. Example 3-1 provides a structure in which a PS on the TFT substrate side and a PS on the CF substrate side are orthogonal to each other in a plan view of the main surface of each of the substrates.

In the liquid crystal display device according to Example 3-1, even if a contact position between a PS 1614 on the TFT substrate side and a PS 1615 on the CF substrate side in FIG. 19 is shifted to a contact position between a PS 1714 on the TFT substrate side and a PS 1715 on the CF substrate side in FIG. 20, the PS 1714 on the TFT substrate side and the PS 1715 on the CF substrate side are maintained in contact with each other, and a contact area 1618 between the PS 1614 on the TFT substrate side and the PS 1615 on the CF substrate side is equal to a sum (a total area) of a contact area 1718*a* and a contact area 1718*b* between the PS 1714 on the TFT substrate side and the PS 1715 on the CF substrate side. In the case shown in FIG. 20, accordingly, a load applied to a liquid crystal panel can be dispersed uniformly in the same manner as in the case of FIG. 19. The PS 1614 and the PS 1714 may be provided on the CF substrate side, and the PS 1615 and the PS 1715 may be provided on the TFT substrate side.

Example 3-2

Figure 21:
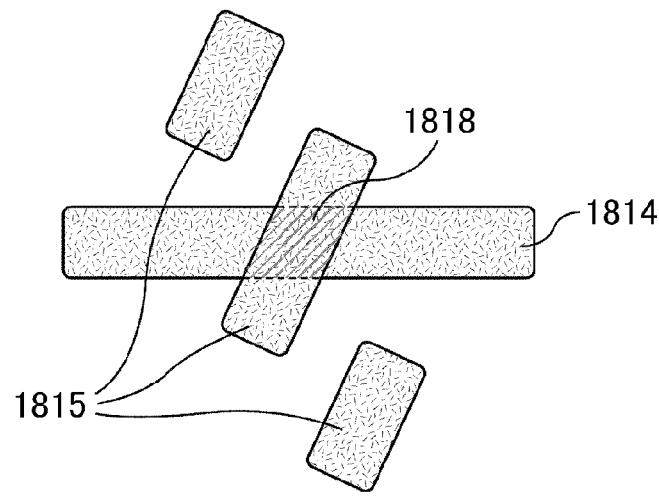
FIG. 21 is a schematic plan view showing arrangement of a spacer provided in a liquid crystal display device according to Example 3-2.
Figure 22:
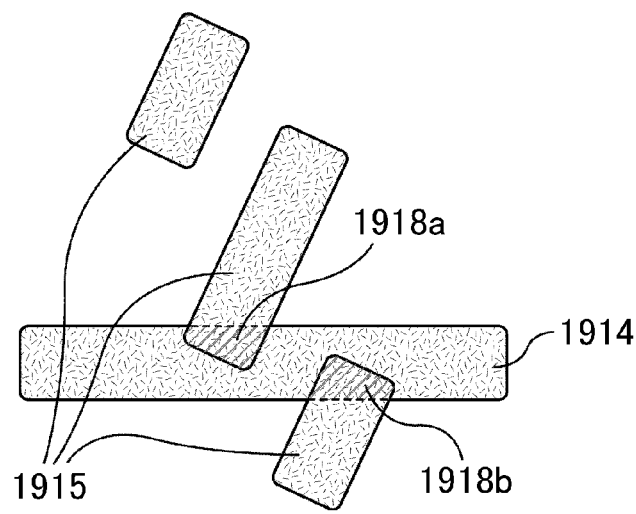
FIG. 22 is a schematic plan view showing a state in the case in which a contact position of the spacer is shifted from the state in FIG. 21.

Structure in which PS on TFT Substrate Side and PS on CF Substrate Side are Not Orthogonal to Each Other in a Plan View of Main Surface of Each of Substrates FIG. 21 is a schematic plan view showing arrangement of a spacer provided in a liquid crystal display device according to Example 3-2. FIG. 22 is a schematic plan view showing a state in the case in which a contact position of the spacer is shifted from the state in FIG. 21. Example 3-2 provides a structure in which a PS on the TFT substrate side and a PS on the CF substrate side are not orthogonal to each other in a plan view of the main surface of each of the substrates.

In the liquid crystal display device according to Example 3-2, even if a contact position between a PS 1814 on the TFT substrate side and a PS 1815 on the CF substrate side in FIG. 21 is shifted to a contact position between a PS 1914 on the TFT substrate side and a PS 1915 on the CF substrate side in FIG. 22, the PS 1914 on the TFT substrate side and the PS 1915 on the CF substrate side are maintained in contact with each other, and a contact area 1818 between the PS 1814 on the TFT substrate side and the PS 1815 on the CF substrate side is equal to a sum (a total area) of a contact area 1918*a* and a contact area 1918*b* between the PS 1914 on the TFT substrate side and the PS 1915 on the CF substrate side. In the case shown in FIG. 22, accordingly, a load applied to a liquid crystal panel can be dispersed uniformly in the same manner as in the case of FIG. 21. The PS 1814 and the PS 1914 may be provided on the CF substrate side, and the PS 1815 and the PS 1915 may be provided on the TFT substrate side.

In consideration of an amount of shift in XY directions (vertical and transverse directions in a plane of a liquid crystal panel) in Embodiment 3, the structure according to Example 3-1 is preferable. The reason is as follows. The lengths of the PS on the TFT substrate side and the PS on the CF substrate side can be reduced more greatly in Example 3-1. Consequently, an aperture ratio can be increased for a rectangular pixel portion 1410 (including a rectangular opening portion) shown in FIG. 17. Although the lengths of the PS on the TFT substrate side and the PS on the CF substrate side are not particularly restricted, it is preferable that they should be equal to or greater than 25 µm and be equal to or smaller than 150 µm. Although the widths of the PS on the TFT substrate side and the PS on the CF substrate side are not particularly restricted, it is preferable that they should be equal to or greater than 5 µm and be equal to or smaller than 50 µm. In the present embodiment, moreover, there is taken the configuration in which the spacer is configured from the single PS on the TFT substrate side and at least one or two of the three PSs on the CF substrate side. However, the number of the PSs on the TFT substrate side and that of the PSs on the CF substrate side are not particularly restricted, and a combination of the other numbers may be applied.

With the structure according to Example 3-2, moreover, it is possible to increase the aperture ratio for a pixel portion 1510 taking a v shape (including an opening portion taking a v shape) shown in FIG. 18.

Figure 23:
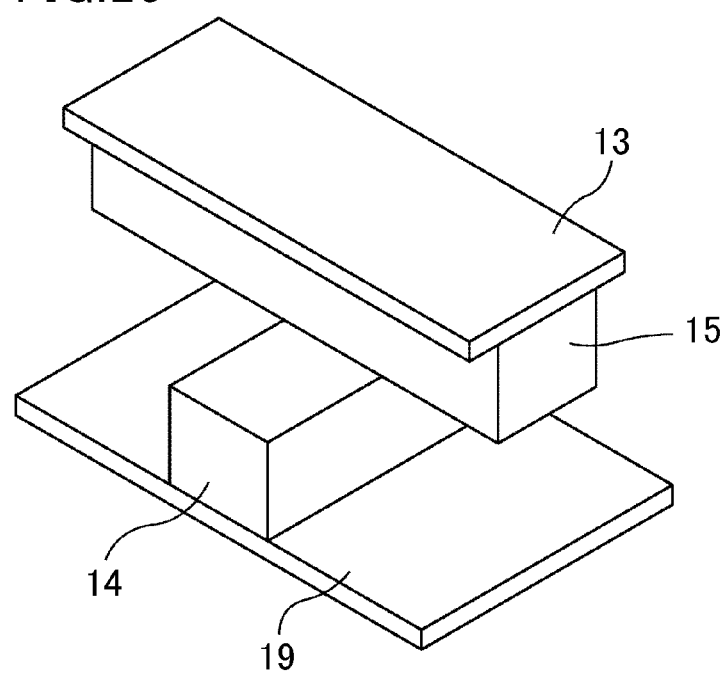
FIG. 23 is a schematic perspective view showing the liquid crystal display device according to Embodiment 1.
Figure 24:
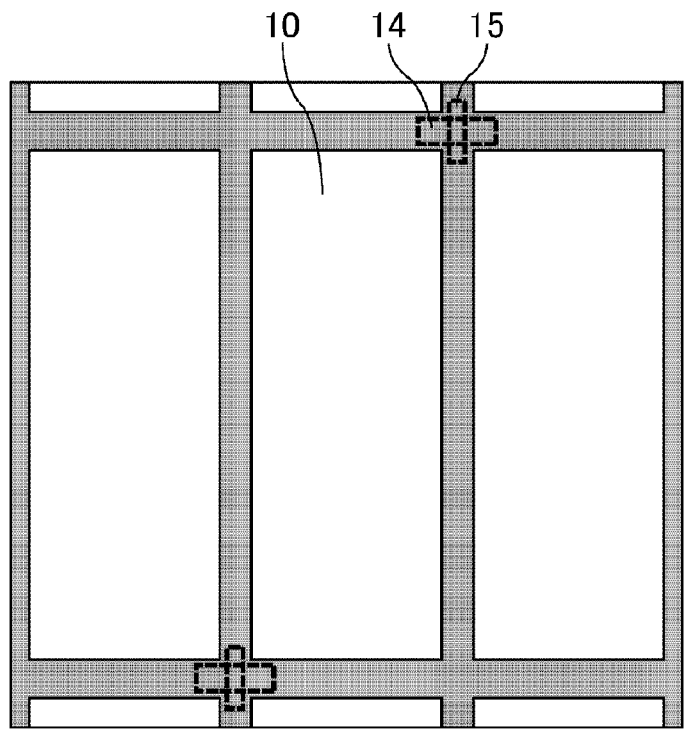
FIG. 24 is a schematic plan view showing only the pixel portion and the spacer in the liquid crystal display device according to Embodiment 1.

FIG. 23 is a schematic perspective view showing the liquid crystal display device according to Embodiment 1. FIG. 24 is a schematic plan view showing only the pixel portion and the spacer in the liquid crystal display device according to Embodiment 1.

In FIG. 23, the PS 14 on the TFT substrate side is disposed on a transparent interlayer insulating film 19 (the CF substrate side) arranged on an upper layer of the gate bus line of the TFT substrate, and the PS 15 on the CF substrate side is disposed along the black matrix 13. FIG. 24 shows the case in which the PS 14 on the TFT substrate side is disposed along the gate bus line (a transverse direction in the drawing) and the PS 15 on the CF substrate side is disposed along the source bus line (the black matrix [a vertical direction in the drawing]). The same goes for the other embodiments. On the other hand, as one of preferred configurations of the present invention, the first spacer provided in the first substrate is disposed along the source bus line possessed by the first substrate and the second spacer provided in the second substrate is disposed along the gate bus line. Usually, the gate bus line possessed by the first substrate has a greater width than that of the source bus line possessed by the second substrate and a larger light shielding region. The second substrate includes a black matrix between respective color filters disposed like a stripe. The spacer is disposed as described above so that the spacer can be disposed in the light shielding region more easily even if a great bonding shift of the upper and lower substrates occurs.

Comparative Example 1

Conventional Liquid Crystal Display Device

Figure 25:
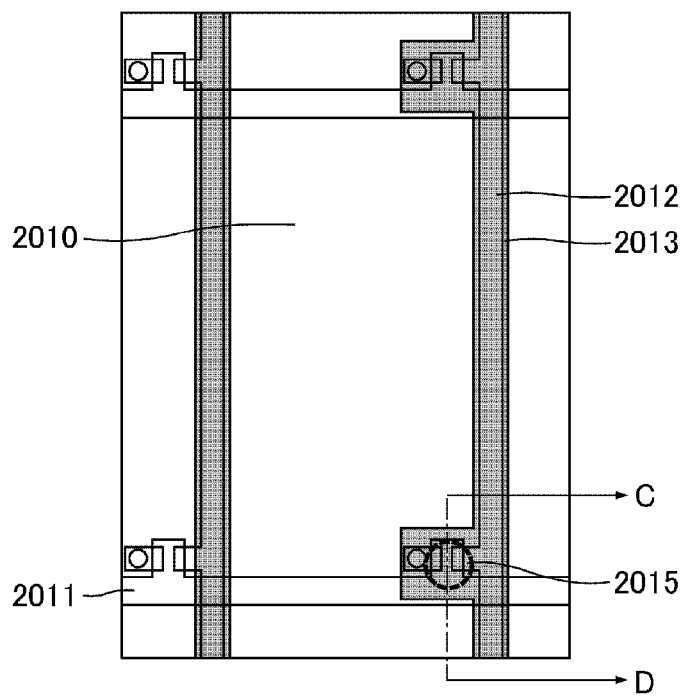
FIG. 25 is a schematic plan view showing a spacer provided in a conventional liquid crystal display device and a periphery thereof which are enlarged.
Figure 26:
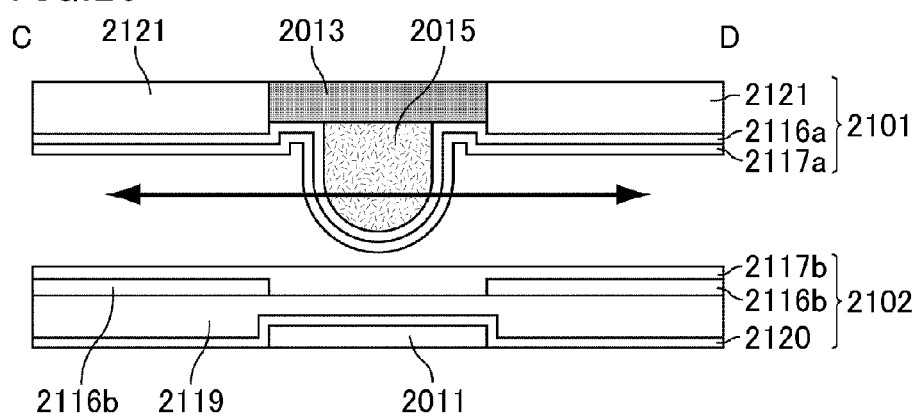
FIG. 26 is a schematic cross-sectional view showing a section of a portion corresponding to a line C-D in FIG. 25.
Figure 27:
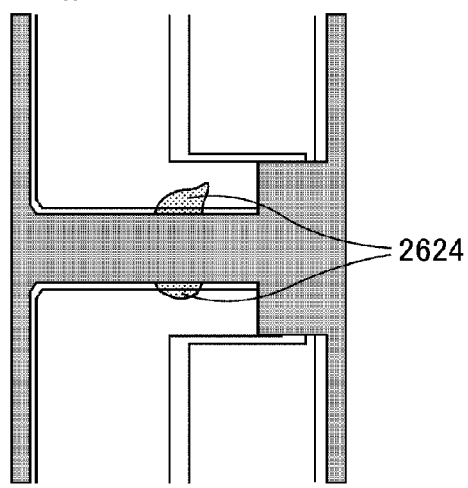
FIG. 27 is a photograph showing a part of a display surface of the conventional liquid crystal display device.
Figure 28:
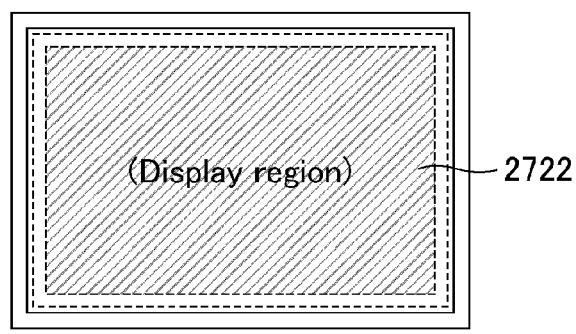
FIG. 28 is a schematic plan view showing a liquid crystal panel.
Figure 29:
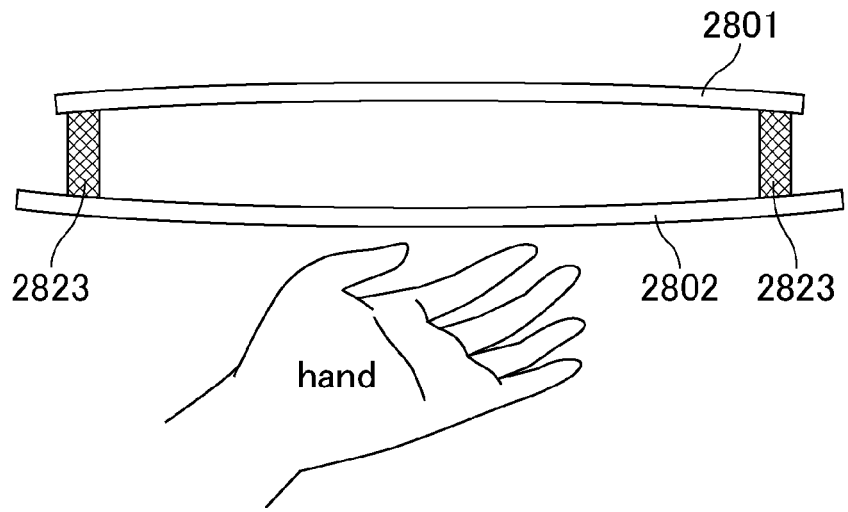
FIG. 29 is a schematic cross-sectional view showing a handling work for the liquid crystal panel.
Figure 30:
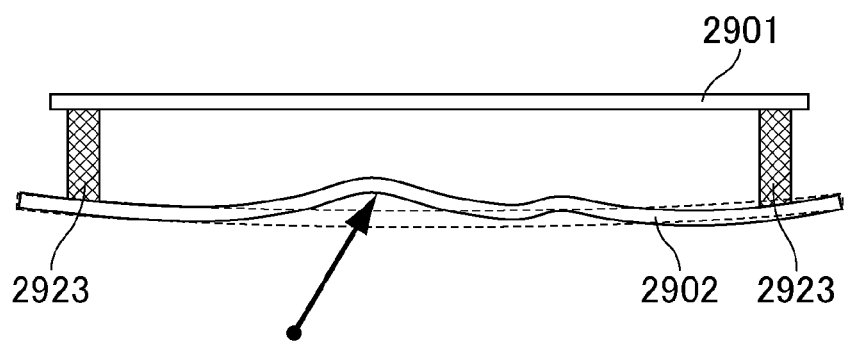
FIG. 30 is a schematic cross-sectional view showing a time of deformation of glass in the liquid crystal panel.
Figure 30:
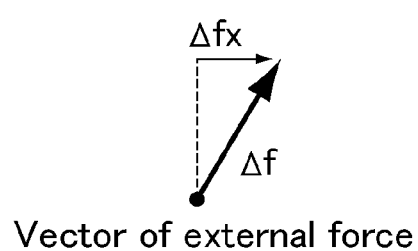

FIG. 25 is a schematic plan view showing a spacer provided in a conventional liquid crystal display device and a periphery thereof which are enlarged. FIG. 26 is a schematic cross-sectional view showing a section of a portion corresponding to a line C-D in FIG. 25. Referring to the conventional liquid crystal display device, in the case in which a contact position of a PS 2015 on the CF substrate side is greatly shifted in a direction of an arrow, the PS 2015 on the CF substrate side rubs an alignment film 2117*b* on a pixel portion of an opposed substrate and alignment regulating force acts by the rub, resulting in occurrence of a light leakage.

Other Suitable Embodiment

In each of the embodiments according to the present invention, an oxide semiconductor TFT (IGZO [In—Ga—Zn—O semiconductor] is particularly preferred) is suitably used. The oxide semiconductor TFT will be described below in detail.

The TFT substrate usually includes a thin film transistor element. It is preferable that the thin film transistor element should include an oxide semiconductor. In other words, it is preferable that an active layer of an active driving element should be formed by using an oxide semiconductor film such as zinc oxide in place of a silicon semiconductor film in the thin film transistor element. In such a case, the TFT is referred to as an "oxide semiconductor TFT". The oxide semiconductor has such a feature as to exhibit higher carrier mobility and a smaller characteristic variation than an amorphous silicon. For this reason, the oxide semiconductor TFT can be operated at a higher speed than an amorphous silicon TFT and is suitable for driving a next generation display device having a higher driving frequency and a higher resolution. Since the oxide semiconductor film is formed in a simpler process than a polycrystalline silicon film, moreover, it has such an advantage as to be applicable to a device requiring a large area.

The aforementioned modes of the embodiments may be employed in appropriate combination as long as the combination is not beyond the spirit of the present invention.

REFERENCE SIGNS LIST 10, 810, 910, 1410, 1510, 2010: pixel portion
11, 811, 911, 1411, 1511, 2011: gate bus line
12, 812, 912, 1412, 1512, 2012: source bus line
13, 813, 913, 1413, 1513, 2013: black matrix
14, 214, 314, 414, 514, 614, 714, 814, 914, 1014, 1014a, 1114, 1214, 1214a, 1314, 1414, 1514, 1614, 1714, 1814, 1914: PS on TFT substrate side
15, 215, 315, 415, 515, 615, 715, 815, 915, 1015, 1015a, 1115, 1215, 1215a, 1315, 1415, 1515, 1615, 1715, 1815, 1915, 2015: PS on CF substrate side
19, 119, 2119: transparent interlayer insulating film
101, 2101, 2801, 2901: CF substrate
102, 2102, 2802, 2902: TFT substrate
116, 2116a, 2116b: pixel electrode
117a, 117b, 2117a, 2117b: alignment film
120, 2120: SiNx or SiOx
218, 318, 418, 518, 618, 718, 1018a, 1018b, 1018c, 1118a, 1118b, 1118c, 1218a, 1218b, 1218c, 1318a, 1318b, 1318c, 1618, 1718a, 1718b, 1818, 1918a, 1918b: contact area
2121: color filter
2624: light leakage
2722: display region
2823, 2923: sealing material
TFT: thin film transistor
CF: color filter

The invention claimed is:

1. A liquid crystal display device comprising:
a first substrate;
a second substrate;
a liquid crystal layer interposed between both of the first substrate and the second substrate; and
a spacer holding a gap between the first substrate and the second substrate, wherein
the spacer includes a first spacer and a second spacer,
the first substrate includes the first spacer, gate bus lines, and source bus lines,
the second substrate includes the second spacer,
respective lengths of the first spacer and the second spacer are equal to or smaller than a length of a short side of a pixel,
widths of the first spacer and the second spacer are different from each other,
the liquid crystal display device includes the first substrate and the second substrate bonded to each other,
the first spacer and the second spacer intersect with each other at a plurality of spacer intersecting portions,
the gate bus lines and the source bus lines intersect with each other at a first bus line intersecting portion, a second bus line intersecting portion adjacent to the first bus line intersecting portion in a direction in which the gate bus lines extend, and a third bus line intersecting portion adjacent to the first bus line intersecting portion in a direction in which the source bus lines extend,
one of the first spacer and the second spacer is disposed along the gate bus lines and the other of the first spacer and the second spacer is disposed along the source bus lines,
the plurality of spacer intersecting portions overlap the first bus line intersecting portion, and do not overlap the second bus line intersecting portion and the third bus line intersecting portion.

2. The liquid crystal display device according to claim 1, wherein each of the first spacer and the second spacer is composed of a resist.

3. The liquid crystal display device according to claim 1, wherein an alignment film is formed between the first spacer and the second spacer.

4. The liquid crystal display device according to claim 1, wherein the first spacer and the second spacer take a shape of a bar extended along the first substrate and the second substrate and an unbent shape.

5. The liquid crystal display device according to claim 1, wherein the first spacer is not in contact with the second substrate and the second spacer is not in contact with the first substrate.

6. The liquid crystal display device according to claim 1, wherein the first spacer and the second spacer are orthogonal to each other in a plan view of the main surface of each of the substrates.

7. The liquid crystal display device according to claim 1, wherein the first spacer and the second spacer are not orthogonal to each other in a plan view of the main surface of each of the substrates.

8. The liquid crystal display device according to claim 1, wherein a contact area between the first spacer and the second spacer in the spacer is substantially equal for each spacer.

9. The liquid crystal display device according to claim 1, wherein the width of the first spacer is greater than the width of the second spacer.

10. A liquid crystal display device comprising:
a first substrate;
a second substrate;
a liquid crystal layer interposed between the first substrate and the second substrate; and
a spacer holding a gap between the first substrate and the second substrate, wherein
the spacer includes a first spacer and a second spacer,
the first substrate includes the first spacer, a bus line, and a thin film transistor element,
the second substrate includes the second spacer and a black matrix,
lengths of the first spacer and the second spacer are equal to or smaller than a length of a short side of a pixel,
the liquid crystal display device includes the first substrate and the second substrate bonded to each other,
the first spacer and the second spacer intersect with each other,
the spacer includes a single first spacer disposed along the bus line and a plurality of second spacers disposed along the black matrix, the single first spacer does not overlap the thin film transistor element, and at least one of the plurality of second spacers overlaps the thin film transistor element.

11. The liquid crystal display device according to claim 10, wherein each of the first spacer and the second spacer is made of a resist.

12. The liquid crystal display device according to claim 10, wherein an alignment film is provided between the first spacer and the second spacer.

13. The liquid crystal display device according to claim 10, wherein the first spacer and the second spacer define an unbent bar extending along the first substrate and the second substrate.

14. The liquid crystal display device according to claim 10, wherein the first spacer is not in contact with the second substrate and the second spacer is not in contact with the first substrate.

15. The liquid crystal display device according to claim 10, wherein the first spacer and the second spacer are orthogonal to each other in a plan view of a main surface of each of the substrates.

16. The liquid crystal display device according to claim 10, wherein the first spacer and the second spacer are not orthogonal to each other in a plan view of a main surface of each of the substrates.

17. The liquid crystal display device according to claim 10, wherein a contact area between the first spacer and the second spacer in the spacer is equal or substantially equal for each spacer.

18. The liquid crystal display device according to claim 10, wherein the widths of the first spacer and the second spacer are different from each other.

19. The liquid crystal display device according to claim 18, wherein the width of the first spacer is greater than the width of the second spacer.

\* \* \* \* \*